(12) United States Patent
Skuratowicz

(10) Patent No.: US 7,649,090 B2
(45) Date of Patent: *Jan. 19, 2010

(54) OXIDATION OF CARBOHYDRATE WITH ULTRAVIOLET RADIATION

(75) Inventor: Roman Skuratowicz, Hickory Hills, IL (US)

(73) Assignee: Corn Productrs International, Inc., Westchester, IL (US)

(*) Notice: Subject to any disclaimer, the term of this patent is extended or adjusted under 35 U.S.C. 154(b) by 108 days.

This patent is subject to a terminal disclaimer.

(21) Appl. No.: 11/503,360

(22) Filed: Aug. 11, 2006

(65) Prior Publication Data

US 2008/0039615 A1   Feb. 14, 2008

(51) Int. Cl.
| | |
|---|---|
| *C07H 1/00* | (2006.01) |
| *C07H 3/00* | (2006.01) |
| *C08B 37/00* | (2006.01) |
| *C08B 31/18* | (2006.01) |
| *C08B 33/08* | (2006.01) |
| *C08B 35/08* | (2006.01) |

(52) U.S. Cl. ..................................... 536/124

(58) Field of Classification Search ............. None
See application file for complete search history.

(56) References Cited

U.S. PATENT DOCUMENTS

| | | | |
|---|---|---|---|
| 3,066,086 | A | 11/1962 | Goda |
| 3,203,885 | A | 8/1965 | Meiners et al. |
| RE25,986 | E | 3/1966 | Goda |
| 3,352,773 | A | 11/1967 | Schwartz et al. |
| 4,104,460 | A | 8/1978 | Hasebe |
| 4,769,082 | A | 9/1988 | Kumakura et al. |
| 5,358,559 | A | 10/1994 | Fitt et al. |
| 5,519,010 | A | 5/1996 | Fan et al. |
| 5,728,665 | A | 3/1998 | Choy et al. |
| 6,777,548 | B1 * | 8/2004 | Kesselmans et al. ......... 536/105 |
| 6,830,784 | B2 | 12/2004 | Gutowski et al. |
| 2003/0157268 | A1 | 8/2003 | Gutowski et al. |

OTHER PUBLICATIONS

Harmon et al. Die Stärke, 1971, Nr. 10, pp. 247-349.*
Kamel et al. Textile Research Journal, vol. 41, No. 5, 450-454 (1971).*

* cited by examiner

*Primary Examiner*—Shaojia Anna Jiang
*Assistant Examiner*—Layla Bland
(74) *Attorney, Agent, or Firm*—Foley & Lardner LLP

(57) ABSTRACT

A process for the oxidation of carbohydrate with UV light. The process comprises the steps of providing a carbohydrate, combining the carbohydrate with an oxidant and exposing the combined carbohydrate and oxidant to ultraviolet light. The process occurs at alkaline conditions.

15 Claims, 1 Drawing Sheet

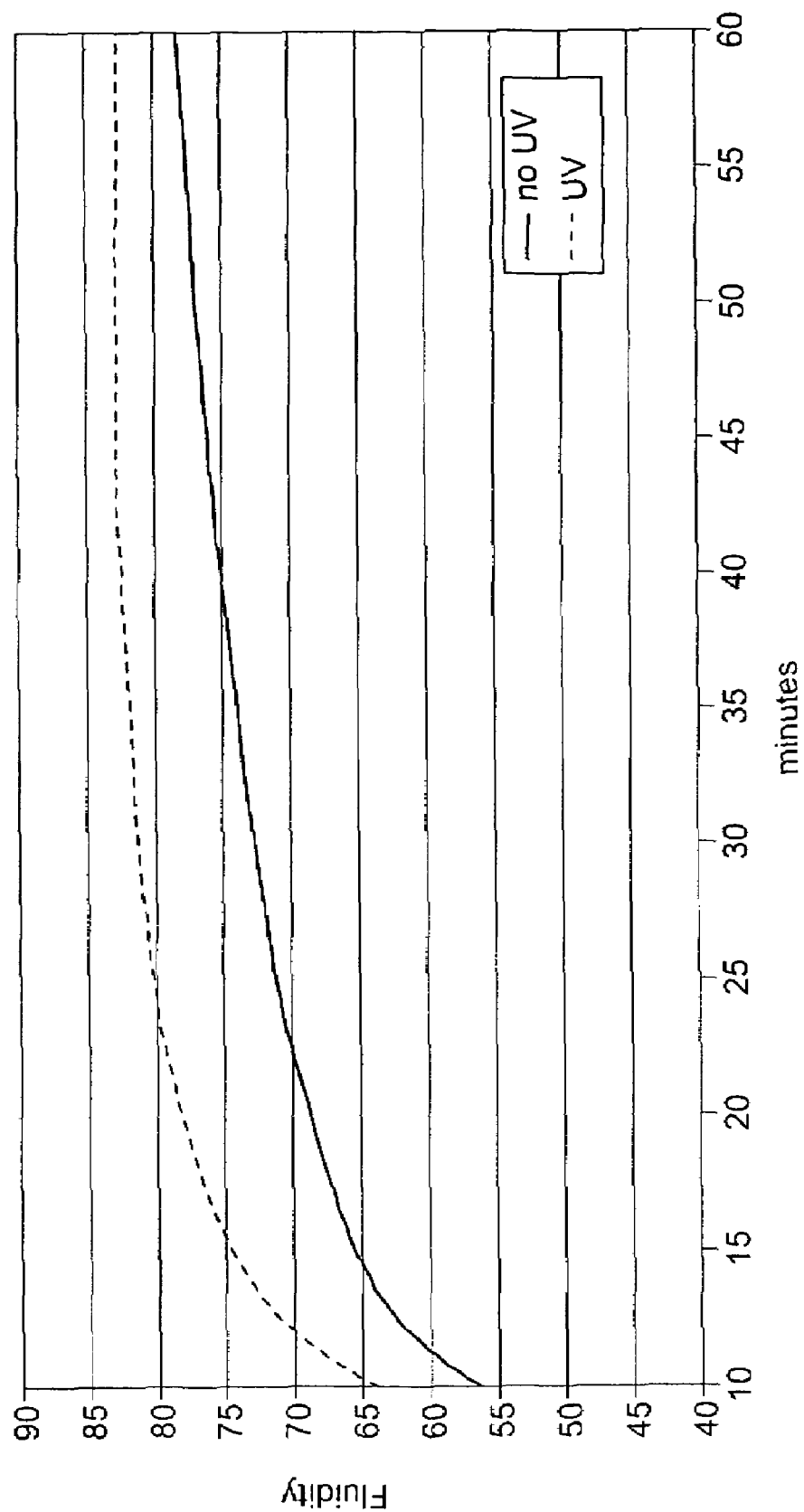

OXIDATION OF CARBOHYDRATE WITH ULTRAVIOLET RADIATION

BACKGROUND OF THE INVENTION

1. Field of the Invention

The invention pertains to processes for oxidizing carbohydrate using hypochlorite or chemically similar oxidizing agent with ultraviolet radiation. The oxidation occurs under alkaline conditions.

2. Background of the Invention

The modification of carbohydrate can be divided into two main types: chemical and rheological. Chemical modification generally refers to the substitution of carbohydrate with chemical groups and by means of changing the charge condition of the carbohydrate, gelling behavior or affecting the temperature stability. Rheological modifications are generally used when higher dry matter contents are desirable in a paste, which means decreasing the viscosity by hydrolysis or oxidation. For hydrolysis, enzymes or acids can be used. Oxidation generally involves treating the carbohydrate with bromine, chloride or the corresponding metal hypohalite in an alkaline aqueous medium. For example, oxidation reactions like the treatment of carbohydrate with hypochlorite, such as sodium hypochlorite. Other oxidants like hydrogen peroxide or ammonium persulfate can also be used. Acid conversion is performed by adding acid to hydrolyze the carbohydrate and reduce viscosity.

Regarding starch, for example, oxidation typically involves cleavage of various linkages in the starch molecule. Starch is a glucose polymer, which consists of glucose units linked together by ether bonds at the 1,4 points on the glucose ring to make the linear backbone, with additional branches to the polymer linked at the 1,6 unit on the ring. Oxidation will cleave either of these linkages, reducing molecular weight of the starch molecules. In addition, oxidation can also cleave the glucose ring between the 2, 3 units, and can additionally convert one or both of the resulting aldehyde groups from cleavage to carboxyls. The choice of oxidant, amount of alkali, temperature and reaction time can cause different rates of thinning as well as vary the amount of carboxyls produced in the thinned starch through the oxidation process. Other selective oxidants, like periodate, will only attack certain bonds on starch, with periodates the 2-3 linkage. Acid modification, or thinning, is conducted at relatively low pH and is a more random cleavage, but can continue on to lower viscosities or convert starch to sugars.

The oxidation of starch using chlorine water and actinic light in a carefully controlled reaction having a pH less than 7 is reported in the art for modification resulting in a high carbonyl content end product. The pH is relevant to the success of this process and it is said in the art that decomposition of aldehyde groups occur when the reaction proceeds above of pH of 7. A process is also reported in the art which consists essentially of irradiating polysaccharide with light relatively rich in ultraviolet frequencies in the presence of a compound comprising a nitrile radical. This chemistry relies on the molecular interaction of nitrites with ultraviolet radiation, specifically related to the unique nitrogen electron pair. Nitriles have a different chemical structure than the halogenated oxidants, which react under different mechanisms.

The art is constantly seeking new and more efficient ways to oxidize carbohydrate, particularly methods which reduce chemical costs or reaction time. The present invention concerns oxidation of carbohydrate comprising the treatment of carbohydrate with hypochlorite or chemically similar oxidizing agent and ultraviolet radiation at alkaline conditions. The process provides a more efficient reaction compared to prior art hypochlorite oxidation methods resulting in improved efficiency, reduced chemical demand and a measured reduction in unwanted organic halides.

SUMMARY OF THE INVENTION

The invention pertains to a process for the oxidation of carbohydrate using an oxidant and ultraviolet light. The process comprises the steps of providing a carbohydrate, adding oxidant to the carbohydrate and exposing the carbohydrate and oxidant to ultraviolet light. The process occurs under alkaline conditions. The invention further pertains to an oxidized carbohydrate obtained through the process.

DETAILED DESCRIPTION OF THE DRAWINGS

FIG. 1 is a graph showing the change in fluidity over time for the hypochlorite oxidation of starch in accordance with the invention comparing the efficiency of hypochlorite oxidation of starch with and without ultraviolet light. The starch compositions analyzed for the graph of this figure are discussed below with respect to Examples 2A and 2B.

DETAILED DESCRIPTION OF THE INVENTION

The invention concerns the oxidation of carbohydrate with 1) an oxidant, such as hypochlorite or chemically similar oxidants like active bromides, halides, oxyhalides and 2) ultraviolet light. Combinations of oxidants can be used. The process comprises the steps of providing a carbohydrate, combining the carbohydrate with an oxidant at an alkaline pH and exposing the combined carbohydrate and oxidant to ultraviolet light. The preferred oxidant is hypochlorite provided by a hypochlorite containing material. In an embodiment of the invention the carbohydrate is in slurry or solution with water and oxidant, or hypochlorite containing material, and sodium hydroxide are added to the slurry or solution. During the oxidation reaction, the slurry or solution is exposed to the ultraviolet light. The ultraviolet light exposure may occur while the oxidant or hypochlorite containing material is added to carbohydrate, or carbohydrate slurry or solution, or the ultraviolet light exposure may begin after the oxidant or hypochlorite containing material is added to the carbohydrate or carbohydrate slurry or solution.

The process is conducted under alkaline conditions, which is at a pH above 7, preferably between about 8 and about 14. The pH must be alkaline for the ultraviolet light to effectively facilitate the oxidation to obtain the improved reaction efficiencies which characterize the process of the invention. The best results are obtained when the pH is about 8 or above, with exemplary results occurring when the pH is between about 8 and about 12. Ranges of pH of about 9 to about 12 and about 10 to about 12 are within the scope of the invention with the reaction efficiencies increasing as the pH range becomes more narrowed.

The process of the invention may be used to oxidize many different types of carbohydrate, and, as used in this specification, carbohydrate is intended to have the broadest possible definition. Carbohydrates used in the process specifically include starch and other polysaccharides such as hydrocolloid and cellulose, either separately or in combination.

Starch is a commodity chemical produced from the root, stem or fruit from a number of plants. It is a high molecular weight carbohydrate polymer which is comprised of linear and branched polysaccharide polymers and it can have moisture content from about 8% to about 20%, most commonly from about 11% to about 13%. Starches such as those derived from corn, wheat, barley, tapioca, potato and the like are suitable, as well as sorghum varieties. Blends of starches from various sources also can be used. Pearl starches and powdered starches, granular starches (uncooked and non-gelatinized starches) and cooked or pregelled starches may be used. Starches derived from other genetic forms of corn, such as high amylose and waxy corn would also be suitable.

The carbonhydrate, particularly starch, may be modified by other processes either before or after the hypochlorite oxidation with UV light. Examples of such processes to modify the carbohydrate include derivation reactions such as cationization, esterification, etherification, phosphorylation, carboxymethylation, crosslinking and the like, to provide oxidized carbohydrate derivatives from the process of the invention. Thus, the invention comprises the process described herein for the oxidation of carbohydrate with ultraviolet light further comprising derivation reactions performed either before or after the carbohydrate is oxidized.

Hemicellulose, such as that described in U.S. Pat. No. 5,358,559 which is incorporated herein in its entirety by reference, is an example of a hydrocolloid that may be oxidized in the process of the invention. Other hydrocolloids that may be oxidized in the process include gum arabic, xanthan gum, gum karaya, tragacanth, sodium alginates, carageenan, Guar gum, Locust bean gum, tara, pectins, gellan, cellulose derivatives such as carboxymethyl, methyl or ethyl cellulose, microcrystalline cellulose, or other polysaccharide type hydrocolloids. Cellulose may also be oxidized in the process. Cellulose is a straight chain polymer made of repeating units of the monomer glucose. The monomers are linked together through 1,4 glycosidic bonds. In addition, carbohydrates include dextrins and maltodextrins, corn syrups and other sugars. Use of carboxymethyl, cationic or other modified carbohydrates is within the scope of the invention. Combinations of carbohydrates, such as combinations of starches, cellulose and hydrocolloids may be oxidized.

The preferred oxidant is hypochlorite and the hypochlorite in the process may be provided by hypochlorite containing material suitable for carbohydrate oxidation. Hypochlorite containing materials provide hypochlorite ions ($ClO^-$), the oxidant, to the carbohydrate or carbohydrate slurry or solution at the physical conditions prevalent during the oxidation reaction, such as at the pH values discussed above. In this specification, the terms hypochlorite and hypochlorite ion are used interchangeably. Metal hypochlorite, such as sodium hypochlorite, potassium hypochlorite, lithium hypochlorite and calcium hypochlorite, or combinations thereof, can be used in the process as the hypochlorite containing material. As discussed above other chemically similar oxidants such active bromides or other halides or oxyhalides which react under similar chemical mechanisms as hypochlorite can be utilized, and these can be used in addition to or in place of the hypochlorite containing material in the method. Also, the invention encompasses methods wherein the only oxidant used in the method is hypochlorite and thus the only oxidizing agent used in the process is a hypochlorite containing material. Also, the invention encompasses methods wherein the oxidant is not hydrogen peroxide or hydrogen peroxide-hypochlorite combinations. Thus, the invention encompasses methods which do not involve hydrogen peroxide or hydrogen peroxide-hypochlorite combinations.

Acid or alkali may be used in the process to control pH. In particular, alkali metal hydroxides, such as sodium hydroxide, potassium hydroxide or calcium hydroxide, may be used to maintain the alkali conditions during the oxidation. Combinations of caustics may be used. The acid or alkali may be added to the carbohydrate or carbohydrate slurry or solution either separately or as part of another component added to the carbohydrate or carbohydrate slurry or solution. Acid or alkali may be added to the oxidant or hypochlorite containing material before the oxidant or hypochlorite containing material is added to the carbohydrate or carbohydrate slurry or solution, may be added simultaneously with the oxidant or hypochlorite containing material to the carbohydrate or carbohydrate slurry or solution, or may be added continuously throughout the reaction to maintain the constant desired pH. The amount of caustic added must be sufficient to maintain the alkaline pH during the reaction, including the pH ranges discussed above.

Ultraviolet light is electromagnetic radiation having a wavelength shorter than that of human visible light and has a distinct range of wavelengths in the light spectrum. Ultraviolet radiation wave lengths preferably used in the invention are about 40 nm to about 400 nm, most preferably about 150 nm to about 300 nm. A further preferred embodiment comprises the use of a dichromatic source of light at two specific wave lengths within the aforementioned ultraviolet wavelength ranges. The ultraviolet light may be provided by ultraviolet light bulbs or other devices which are capable of emitting ultraviolet light or electromagnetic radiation at wavelengths associated with ultraviolet light. For example, commercial ultraviolet water purification equipment or commercial ultraviolet curing systems can be used in the process to provide the ultraviolet light.

The use of ultraviolet light with oxidation has been shown to increase reaction rate when compared to similar reaction conditions without ultraviolet light. This results in more efficient use of oxidant in the reaction, which can result in lower reaction times or create an oxidized carbohydrate with much lower viscosity using the same chemicals and reaction time. As a result, for example, lower viscosity starches can be produced by treatment with ultraviolet light and hypochlorite and/or chemically similar oxidants than with the oxidant alone under practical industrial conditions. Alternatively, oxidant can be reduced to save chemical costs to make a similar viscosity oxidized carbohydrate with ultraviolet treatment. The ultraviolet treatment has minimal if any effect on carboxyl content of similar viscosity oxidized carbohydrates, such as starches. Absorbable organic halides, a byproduct of hypochlorite oxidation, are reduced by using the ultraviolet/hypochlorite treatment compared to conventional hypochlorite treatments, and similar reductions can also be achieved when chemically similar oxidants to hypochlorite are used.

The combination of ultraviolet light with hypochlorite or chemically similar oxidant can complete the oxidation reaction in a significantly faster time than in oxidation reactions without the ultraviolet light, and thus the process of the invention will consume all or nearly all residual oxidants during the reaction. Typical commercial oxidation processes with hypochlorite or chemically similar oxidant will terminate the oxidation reaction after a set time by adding a reducing chemical such as sodium bisulfite to consume remaining oxidant. In the process of the invention, these additional chemicals, e.g. reducing chemicals, are not necessary because the process consumes all or nearly all of the oxidants which further reduce chemical costs compared to conventional oxidation reactions, like hypochlorite oxidation reactions, without ultraviolet light.

The oxidized carbohydrate has a number of uses and may be incorporated into a number of products. For example, pastes made from the oxidized carbohydrate provide viscosity reduced carbohydrates for corrugating adhesives, paper sizing and paper coatings. The oxidized carbohydrate, in powder form or in a paste, can be used as a thickener in foods, as well as in other food applications, such as for texturizing, gels, fat replacement, dusting and the like. Further, the oxidized carbohydrate may be used in pharmaceuticals and cosmetics for gels, pastes and lotions.

EXAMPLES

Example 1

A starch slurry having 38% solids content comprising 15.6 pounds of starch commercial basis ("cb") (Code 030050 from Corn Products International, Inc., Westchester, Ill., USA ("Corn Products")) and 21 pounds of water was formulated. A sodium hypochlorite solution having approximately 16% active chlorine and 4.5% sodium hydroxide in an amount of 1,420 grams was added. The slurry with the hypochlorite was circulated for about 70 minutes at a pH of 11.5 in a Photocat-L Pilot Reactor from Purifics-ES, London, Ontario, Canada. During the hypochlorite reaction the slurry was exposed to 49.9 kilowatt hours of ultraviolet light.

The slurry was sampled for fluidity during the hypochlorite reaction. Fluidity is a measurement of viscosity and was determined by pasting a sample of the oxidized starch with dilute alkali and passing the starch paste through a funnel with a standard orifice to measure flow rate. The higher the fluidity of the sample, the lower its viscosity. In this example, the fluidity of a sample 40 minutes after the start of the reaction was 82 seconds, and the fluidity at the completion of the trial (70 minutes after the start of the reaction) was also 82 seconds. Untreated starch has a typical fluidity of 0 to about 2 seconds.

Viscosity of samples at the completion of the trial (70 minutes after the start of the reaction) was evaluated using a Microbrabender from Brabender Inc., Duisburg, Germany at a pH of 7.5 and 17% solids. The Microbrabender conditions were heat/cool 7.5° C./min to a temperature from 50° C. to 95° C. then hold for 10 minutes. Next the sample was allowed to cool to 50° C. and held 60 minutes. The rotation speed was 75 rpm. The viscosity of the sample after being held at 95° C. then hold for 10 minutes was 7 brabender units ("BU"), the viscosity when the sample reached 50° C. after the cooling was 60 BU and after the 60 minute hold time at 50° C. the viscosity of the sample was 98 BU.

Examples 2A and 2B

Two starch slurries, each having 38% solids content comprising 15.6 pounds of starch cb (Code 030050 from Corn Products) and 21 pounds of water were formulated. A sodium hypochlorite solution having approximately 16% active chlorine and 4.5% sodium hydroxide in an amount of 1,420 grams was added to each slurry. In Example 2A the hypochlorite reaction was permitted to proceed for about 60 minutes at a pH of 11.5 without ultraviolet light for comparison to the reaction with ultraviolet light. The slurry of Example 2B with the hypochlorite was circulated for about 40 minutes at a pH of 11.5 in a Photocat-L Pilot Reactor from Purifics-ES. During the hypochlorite reaction the slurry of Example 2B was exposed to 49.9 kilowatt hours of ultraviolet light.

Both slurries were sampled for fluidity during the hypochlorite reaction using the procedure discussed above for Example 1. In Example 2A, the fluidity was 69 seconds at 20 minutes after the start of the reaction, 75.3 seconds at 40 minutes after the start of the reaction and 78.5 seconds at 60 minutes after the start of the reaction. In Example 2B, the fluidity was 64.5 seconds at 10 minutes after the start of the reaction, 78.5 seconds at 20 minutes after the start of the reaction and 82.8 seconds at 40 minutes after the start of the reaction. As mentioned above, untreated starch has a typical fluidity of 0 to about 2 seconds. FIG. 2 is a graph showing a comparison of the fluidity over reaction time of the slurry of Example 2A which was hypochlorite oxidized without ultraviolet light and the slurry of Example 2B which was hypochlorite oxidized with ultraviolet light. The graph of FIG. 2 demonstrates that the ultraviolet light provides for a more efficient hypochlorite reaction in that the ultraviolet light provides a reaction product with greater fluidity in less reaction time.

Residual oxidants were also tested using standard commercially available test strips. Example 2A showed over 1,000 ppm oxidants after 60 minutes, while Example 2B had no residual oxidants after 40 minutes of reaction time, thus demonstrating that the use of ultraviolet radiation effectively consumes all oxidants in the reaction. Sodium bisulfate was added to both samples to destroy residual oxidants although the test strip data established that Example 2B had no residual oxidants after the reaction.

The viscosities of samples from Examples 2A and 2B were evaluated using a Microbrabender from Brabender Inc. following the procedure described above in Example 1. In Example 2A, a sample analyzed after 60 minutes of reaction time had a viscosity of 11 BU after being held at 95° C., 70 BU when the sample reached 50° C. after the cooling and 101 BU after the 60 minute hold time at 50° C. In Example 2B, samples were analyzed after 20 minutes and 40 minutes of reaction time. A sample from Example 2B analyzed after 20 minutes of reaction time had a viscosity of 21 BU after being held at 95° C., 200 BU when the sample reached 50° C. after the cooling and 338 BU after the 60 minute hold time at 50° C. A sample from Example 2B analyzed after 40 minutes of reaction time had a viscosity of 7 BU after being held at 95° C., 50 BU when the sample reached 50° C. after the cooling and 92 BU after the 60 minute hold time at 50° C.

The carboxyl content of samples of Examples 2A and 2B was determined by acidification of carboxyl groups followed by stoichiometric filtration. After 60 minutes of reaction time a sample of Example 2A had a carboxyl content of 0.34%. After 20 minutes of reaction time a sample of Example 2B had a carboxyl content of 0.29%. These samples represent virtually the same fluidity or viscosity, and carboxyl content for both are within the experimental accuracy of the filtration.

The Adsorbable Organic Halide ("AOX") content of samples of Example 2A and 2B were determined by combustion/microcoulometric filtration after adsorption of the AOX from slurries onto carbon columns. The AOX content of Example 2A after the 60 minutes of reaction time was 130 mg/kg (expressed as chloride), and the AOX content of Example 2B after 40 minutes of reaction time was 92 mg/kg (expressed as chloride). By contrast, chloride levels for both slurries were similar at 2.9%, indicating a 30% reduction of AOX in the same level of chlorine.

The comparison test results from Examples 2A and 2B reveal that the ultraviolet light more efficiently oxidizes the carbohydrate. Similar physical properties of the oxidized carbohydrate were achieved after a reaction time of about 20 minutes for the reaction occurring with ultraviolet light as were achieved after a 60 minute reaction time when the reaction occurred without ultraviolet light. With further reaction time, the ultraviolet treated slurry continued to thin until all residual oxidant was consumed, stopping the reaction.

I claim:

1. A process for the oxidation of carbohydrate comprising the steps of providing a carbohydrate, combining the carbohydrate with an oxidant selected from the group consisting of hypochlorite, active bromides, oxyhalides and combinations thereof and exposing the carbohydrate and oxidant to ultraviolet light wherein the process occurs under alkaline conditions at a pH from 10 to 12, and wherein the oxidant does not comprise hydrogen peroxide or hydrogen peroxide-hypochlorite combinations.

2. The process of claim 1, wherein the carbohydrate is in a slurry or solution with at least water.

3. The process of claim 1, wherein all of the oxidant is consumed in the process.

4. The process of claim 1, wherein the carbohydrate is selected from the group consisting of starch, hydrocolloids, cellulose, dextrins, maltodextrins, polysaccharides and combinations thereof.

5. The process of claim 4, wherein the hydrocolloid is selected from the group consisting of hemicellulose, gum arabic, xanthan gum, gum karaya, tragacanth, sodium alginates, carageenan, Guar gum, Locust bean gum, tara, pectins, gellan, carboxymethyl, methyl or ethyl cellulose derivatives, microcrystalline cellulose and combinations thereof.

6. The process of claim 1, wherein an acid or alkali is used to control pH.

7. The process of claim 6, wherein the alkali is an alkali metal hydroxide.

8. The process of claim 1, comprising the additional step of a derivation reaction, wherein the derivation reaction is selected from the group consisting of cationization, esterification, etherification, phosphorylation, carboxymethylation and crosslinking.

9. A process for the oxidation of carbohydrate comprising the steps of providing a carbohydrate, combining the carbohydrate with a hypochlorite containing material and exposing the carbohydrate and hypochlorite containing material to ultraviolet light wherein the process occurs under alkaline conditions at a pH from 10 to 12, and wherein the oxidant does not comprise hydrogen peroxide or hydrogen peroxide-hypochlorite combinations.

10. The process of claim 9, wherein the hypochlorite containing material provides hypochlorite ions and all of the hypochlorite ions are consumed in the process.

11. The process of claim 9, wherein the hypochlorite containing material is a metal hypochlorite.

12. The process of claim 11, wherein the metal hypochlorite is selected from the group consisting sodium hypochlorite, potassium hypochlorite, lithium hypochlorite, calcium hypochlorite and combinations thereof.

13. The process of claim 9, wherein the carbohydrate is starch.

14. The process of claim 9, wherein the carbohydrate is in a slurry or solution with at least water.

15. The process of claim 9, wherein an acid or alkali is used to control pH.

* * * * *